US008858688B2

(12) United States Patent
    Barrett

(10) Patent No.: US 8,858,688 B2
(45) Date of Patent: Oct. 14, 2014

(54) TOXIC GAS REMOVAL AND AIR CONDITIONING SYSTEM FOR HUMAN LIFE SUPPORT IN ENCLOSED REFUGE SPACES

(75) Inventor: James P. Barrett, Liberty Lake, WA (US)

(73) Assignee: Venture Corporation Limited, Singapore (SG)

( * ) Notice: Subject to any disclaimer, the term of this patent is extended or adjusted under 35 U.S.C. 154(b) by 321 days.

(21) Appl. No.: 13/484,792

(22) Filed: May 31, 2012

(65) Prior Publication Data
    US 2012/0304866 A1   Dec. 6, 2012

Related U.S. Application Data

(60) Provisional application No. 61/491,841, filed on May 31, 2011.

(51) Int. Cl.
    *B01D 53/02*    (2006.01)
    *F04D 25/08*    (2006.01)
    *E21F 11/00*    (2006.01)
    *E21F 3/00*     (2006.01)
    *B01D 53/74*    (2006.01)
    *F04D 27/00*    (2006.01)
    *B01D 53/62*    (2006.01)

(52) U.S. Cl.
    CPC ........ *B01D 53/74* (2013.01); *B01D 2259/4508* (2013.01); *F04D 25/08* (2013.01); *E21F 11/00* (2013.01); *E21F 3/00* (2013.01); *B01D 2257/504* (2013.01); *B01D 2257/502* (2013.01); *F04D 27/00* (2013.01); *B01D 53/62* (2013.01)
    USPC .............................................. 96/108; 96/244

(58) Field of Classification Search
    CPC .............. B01D 2257/502; B01D 2257/504; B01D 2259/4508; B01D 53/62; B01D 53/74; E21F 11/00; E21F 3/00; F04D 25/08
    USPC ....................................................... 96/108, 244
    See application file for complete search history.

(56) References Cited

U.S. PATENT DOCUMENTS 7,448,252 B2 * 11/2008 Brosnihan et al. ............ 73/31.03
2007/0113686 A1 * 5/2007 Desrochers et al. ....... 73/863.33
(Continued)

OTHER PUBLICATIONS

Bose, Chalasani S C., "Water loss in valve regulated batteries," IEEE 1998, 0-7803-5069-3, pp. 79-84.

(Continued)

*Primary Examiner* — Christopher P Jones
(74) *Attorney, Agent, or Firm* — Craig M. Stainbrook; Stainbrook & Stainbrook, LLP

(57) ABSTRACT

An intrinsically safe, self-contained toxic gas removal and air conditioning system for use in an underground mine environment to continuously remove from air sealed in the chamber the $CO_2$ and/or CO from exhalations of up to thirty adult occupants. The system includes an explosion-proof/fire-proof shell strong enough to withstand a 15 psi explosion outside the survival chamber in which the air-scrubbing system is installed. In the event of normal power loss, the system runs on an internal battery capable of 96+ hours of continuous operation while incapable of creating an explosion hazard. A fan motor mounted inside the external shell is driven by a fan driver circuit and is coupled to a driveshaft extending outside the external shell to drive an air scrubber fan. A fan driver/controller circuit powers the fan and detects the loss of externally-provided AC power to automatically start operation when such power loss is detected.

23 Claims, 12 Drawing Sheets

(56) References Cited

U.S. PATENT DOCUMENTS

| | | | |
|---|---|---|---|
| 2007/0202796 A1* | 8/2007 | Kennedy et al. | 454/230 |
| 2008/0137589 A1* | 6/2008 | Barrett | 370/327 |
| 2008/0196329 A1* | 8/2008 | Kennedy et al. | 52/169.6 |
| 2009/0140852 A1* | 6/2009 | Stolarczyk et al. | 340/539.13 |
| 2009/0197518 A1* | 8/2009 | Reuther et al. | 454/170 |
| 2009/0316530 A1* | 12/2009 | Bunyard et al. | 367/137 |
| 2010/0018391 A1* | 1/2010 | Whittaker et al. | 95/23 |
| 2010/0071393 A1* | 3/2010 | Tatton et al. | 62/121 |
| 2010/0175334 A1* | 7/2010 | Mcdonald et al. | 52/79.9 |
| 2012/0046792 A1* | 2/2012 | Secor | 700/276 |
| 2013/0153060 A1* | 6/2013 | Barrett | 137/551 |

OTHER PUBLICATIONS

Laman, Fred C., et al., "Accelerated Failure Testing of Valve Regulated Lead-Acid Batteries using Gas Studies," 1998 IEEE, 0-7803-5069-3, pp. 74-78.

* cited by examiner

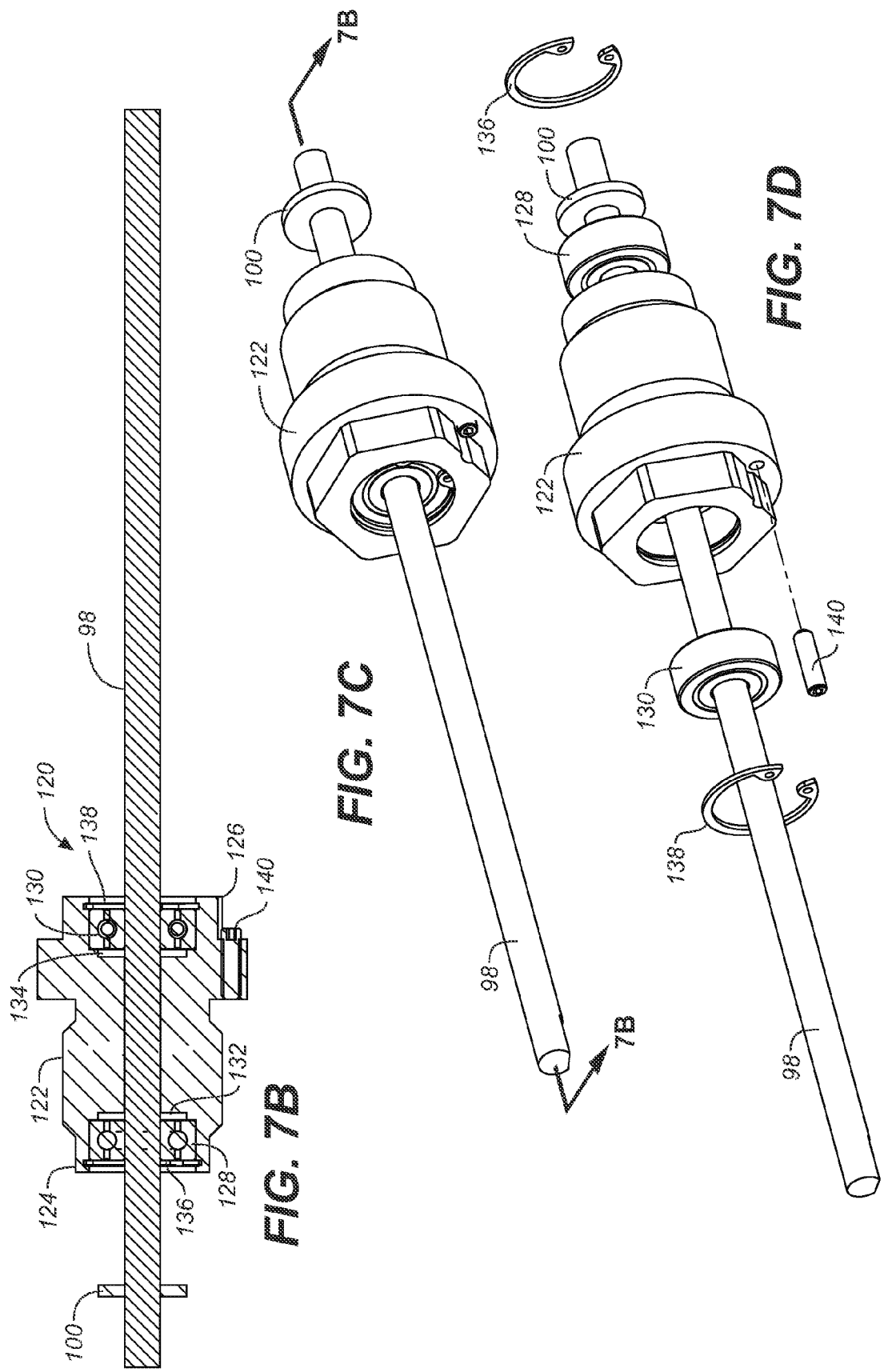

TOXIC GAS REMOVAL AND AIR CONDITIONING SYSTEM FOR HUMAN LIFE SUPPORT IN ENCLOSED REFUGE SPACES

CROSS REFERENCE TO RELATED APPLICATIONS

The present application claims the benefit of U.S. Provisional Patent Application Ser. No. 61/491,841, filed May 31, 2011.

SEQUENCE LISTING

Not applicable.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Field of the Invention

This invention relates to safety systems for miners operating in an underground mine. More particularly, this invention relates to a toxic gas removal and air conditioning system for providing safe and breathable air to occupants of a miner survival chamber when the atmosphere outside the chamber contains potentially harmful gases.

2. Background Discussion

Events such as floods, nuclear radiation accidents, explosions, fires, chemical spills, terrorist toxic gas attacks, and many other such hazards, can require that humans in an affected area take refuge. Underground mines, in particular, present a host of such hazards. There are numerous risks inherent in underground mining operations: fires, cave-ins, methane or coal-dust explosions, flooding, asphyxiation, poisonous gasses in the mine atmosphere, and so forth.

When any person must seek refuge from the aftermath of an event such as those described above, most especially when miners are trapped underground, survival may depend upon the ability to find temporary shelter inside a survival refuge chamber until the danger has passed, or until rescue responders find and extract the miners from the chamber. Specially designed survival chambers are therefore typically placed at various locations in a mine, and miners are trained and drilled to know these locations almost reflexively. In this way, if a mine accident occurs, the miners can quickly find and enter the nearest survival chamber, where they can occupy the chamber until it is safe to exit.

Since survival chambers are air-sealed to prevent the intrusion of dangerous gasses that may be present in the mine atmosphere outside the chamber, the miners have only four possible sources of oxygen ($O_2$). These include: (1) the $O_2$ present in chamber air before it was sealed, which can include $O_2$ found in compressed air tanks inside the chamber; and (2) the $O_2$ that can be introduced into the chamber from another source outside the chamber, including $O_2$ found in (a) air piped into the chamber from outside compressed air tanks; (b) the mine atmosphere immediately surrounding the chamber; and (c) air piped into the chamber from a source outside the mine.

The amount of time that a miner (or group of miners) can survive in a survival chamber depends, at least in part, on the amount of $O_2$ available inside the chamber. Since the rescue operations may take days (even weeks), it is critically important that survivable $O_2$ levels be present in the air inside the chamber for the longest period of time possible.

It is important to recognize that air inside a sealed chamber occupied by humans becomes contaminated over time, due primarily to the occupant exhalations that introduce additional carbon dioxide ($CO_2$) and carbon monoxide (CO) into the chamber's atmosphere.

When the ratio of $CO_2$ or CO to $O_2$ is too large, the survival chamber occupants can suffer $CO_2$ or CO poisoning. To prevent this condition, air-scrubbing systems are employed within the chamber to remove excess $CO_2$ and CO from the chamber atmosphere. Such an air-scrubbing system must be intrinsically safe in a mine environment, meaning that it must not be able to generate unsafe conditions, such as generating a spark, or emitting an explosive or poisonous gas in sufficient quantity to present a danger. It must also be very rugged to ensure uninterrupted operations in the hostile environment characteristic of underground mines. Additionally, it must be capable of surviving the forces present inside the chamber when an explosion occurs outside the chamber. [For purposes of the instant application, "intrinsically safe" shall take the meaning set out in 30 CFR Pt. 18.2: "Intrinsically safe means incapable of releasing enough electrical or thermal energy under normal or abnormal conditions to cause ignition of a flammable mixture of methane or natural gas and air of the most easily ignitable composition."]

Further, such a system would optimally detect loss of externally-supplied power, and automatically begin operation when such a condition is detected, so it is not necessary for miners to manually start or operate the air scrubber.

The noise generated by an air-scrubbing system should also be minimized. This is because miners occupying the survival chamber must listen to the noise for extended periods of time, and the psychological impact of this long-term exposure to the noise can be negative.

In order for a rescue team to verify that the air-scrubber system is operating (without entering the survival chamber), the air-scrubbing system should have a way to wirelessly communicate its condition to systems outside the chamber.

The current art does not provide satisfactory solutions to any of these problems, and the marketplace does not include any air-scrubbing systems for use in survival chambers in underground mines that meet all of these requirements. There is thus an urgent and critical need for such a system to significantly improve the ability of trapped miners to survive a catastrophic incident.

BRIEF SUMMARY OF THE INVENTION

In designing a solution to the foregoing problems, a principal concern was to devise a system that establishes and maintains a suitable atmosphere in an enclosed refuge chamber or space for human occupants seeking refuge from catastrophic events that would otherwise threaten their life. The present invention advances the art by providing a technically practicable and economically feasible way for humans to reside safely for a period of several days inside an enclosed refuge space, using self-contained and battery powered life support systems, while the hazardous conditions outside abate or until the refuge occupants are rescued. A particularly challenging aspect of the problem for underground mines is that the atmosphere is often explosive and this requires that all electrical systems be intrinsically safe or explosion-proof and therefore incapable of igniting the explosive atmosphere in the mine.

Known prior art refuge chambers have a few shortcomings or limitations specifically addressed by the present invention. A notable limitation concerns the lack of intrinsic safety in prior art systems. This standard is not easily achieved while also achieving state-of-the-art power efficiencies needed to provide (1) practical amounts of battery energy storage, (2) low levels of additive heat that exacerbate human heat stroke risk, (3) low risk of hydrogen off-gassing and the attendant explosion risks, and (4) sufficient cooling capacity in a system not allowed to use significant amounts of electrical energy in the explosive atmosphere assumed to be present in any scenario requiring refuge activation/occupancy.

The present invention is a novel self-contained air-scrubbing system, powered by its own internal battery for a period of 96+ hours, capable of continuously removing the amount of $CO_2$ and CO introduced by the breath exhaust of up to thirty adult refuge chamber occupants from the air sealed into a survival chamber. This self-contained air-scrubbing system can be configured to interface to external ducting, so the $CO_2$ and CO filters can be remotely located where appropriate to improve circulation or ventilation.

The present invention provides an air-scrubbing system rugged enough to survive the hostile environment of an underground mine, having the ability to withstand the forces applied to it when an explosion occurs outside the survival chamber in which it resides.

The air scrubber of the present invention is designed to withstand the secondary effects of a 15 psi explosion outside of the survival chamber in which it is contained. This level of survivability is dictated in the test protocol specified by the Mine Safety and Health Administration (MSHA).

The self-contained air-scrubbing system of the present invention is intrinsically safe ("I.S.") and "permissible" for use in an underground mine environment. This is due to the internal design of the unit, as well as the use of a battery that does not contain enough water (thus, hydrogen atoms) to create a hazard, even under the worst conditions, and by the use of explosion-proof and flame-proof driveshaft bearings and enclosure.

The air-scrubbing system of the present invention generates minimal sound while in operation. This is accomplished, in part, by using a significantly smaller and more efficient motor than is found in current state of the art air-scrubbing systems.

The air-scrubbing system of the present invention detects the loss of AC power to the system, and automatically begins operating when this power loss condition is detected. This ensures operation, even when miners barely reach the chamber before succumbing to exhaustion or unconsciousness. Thus, the miners are not required to start or operate the system manually.

The air-scrubbing system of the present invention can be remotely monitored from a nearby location inside the mine if, for instance, a MineTracer FASC is installed outside the chamber, or if a "walk-by inspector" carries a wireless monitoring device from the MineTracer system. Such monitoring is enabled by a circuit in the air-scrubbing system that can communicate wirelessly with elements of the MineTracer network. [The MineTracer wireless mine monitoring, tracking, and communications network is described in detail in U.S. patent application Ser. No. 11/775,831, entitled, "Wireless Mine Tracking, Monitoring, and Rescue Communications System," published Jun. 1, 2008, and bearing U.S. Pat. Appl. Pub. No. 20080137589, which is incorporated in its entirety by reference herein.] The air-scrubbing system of the present invention can be remotely monitored from outside the mine and on the ground surface above the mine if a MineTracer network is installed in the mine. This is enabled by a circuit in the air-scrubbing system that communicates wirelessly with elements of the MineTracer network.

The air-scrubbing system of the present invention eliminates the need to maintain giant lead acid battery banks with distributed wiring. Lead-acid batteries emit dangerous gasses, and distributed wiring presents a safety hazard in the underground mine environment when explosive gasses are present. Implementation of the present invention with its internal battery and very low operating current requirements is far less costly to the mine operator, and much safer.

The present invention also implements an innovative means for using natural convection to recirculate and ventilate the enclosed area. The high heat of air ejected from $CO_2$ filters is directly upwardly so as to ensure that the cleanest air goes to the ceiling, while a fan pickup is located at floor level to ensure collection of the dirtiest air, thereby making optimal use of the thermal gradients and convection forces to aid in the efficient cleaning of the survival chamber air with a minimum of consumed ventilation power. This effectively recaptures and reuses the heat energy inherent in the chemical scrubbing process as an additional source of ventilating energy in a maximum-efficiency closed loop system. In effect, the chemical scrubbing cartridges become like additional virtual batteries of stored energy in the refuge.

The heat generation and dissipation of the motor is innovatively engineered to avoid adding heat to the occupied environment and to guarantee motor thermal reliability in enclosed space. This is accomplished through the use of an exceptionally small motor with low motor dissipation, excellent thermal conductivity, and an innovated conductive heat sink. The motor therefore has the ability to get rid of heat rapidly. This innovative low-power design ensures that the amount of lead-acid batteries necessary to operate the system in small enough amount to guarantee against the need to ventilate hydrogen from the survival chamber. This fail-safe is absolutely guaranteed, based on the fact that there is insufficient water in the battery, and therefore too few hydrogen atoms, to ever reach the lower explosive limit ("LEL") in the chamber volume. This obtains no matter what kind of faults may occur in the charging process or as a result of battery failure or thermal runaway, and so forth.

The system has a flame-proof driveshaft bearing assembly that allows a non-intrinsically safe motor to reside inside battery compartment. The flame-proof driveshaft bearing assembly uses an innovated and cost-effective packing gland as part of a flame-proof bearing assembly, or alternatively may use a flame-proof ball bearing assembly of similar construction.

The present invention also utilizes overload protection circuits to ensure against driveshaft seize, over-current and other faults.

The present invention provides reasonably priced practical solutions that will motivate widespread industry deployment of enclosed-space refuge shelters throughout the world in a host of hazardous areas. This will make it possible to save many more lives imperiled by major atmospheric accidents/hazards.

The present invention achieves the objects above by providing a completely self-contained and automated system for removing toxic gasses from an enclosed refuge space, and for cooling and dehumidifying that space. The system is intended for refuge spaces where human beings take refuge from life-threatening events. The cooling system innovatively uses water ice that is already in solid form prior to a mine accident as an extremely high-capacity heat sink, while allowing for the use of extremely small and intrinsically-safe power levels that can practically be provided from very small batteries to force air through the cooling ice heat-exchanger to form a unique and exceptionally efficient/practical battery-powered cooler that can provide literally hundreds of kilowatt hours of cooling for a 96 hour occupancy duration while only consuming 1 kilowatt hour of intrinsically safe electrical energy.

The essential system components include: (a) a battery powered ventilation fan to recirculate air; (b) a rechargeable battery supply; (c) a battery charging system; (d) a fan motor housed in an explosion-proof and flame-proof enclosure; (e) a fan motor driver/controller circuit having a wireless interface to external wireless monitoring and/or control devices; (f) an air blower assembly mechanically driven by the fan motor via an explosion-proof/flame-proof driveshaft bearing assembly; (g) an antenna; (h) a set of chemical filters tailored to remove particular toxic gasses, including at least carbon monoxide and carbon dioxide; (i) an air duct system that delivers the proper air pressure and flow rate conditions to efficiently drive contaminated air through chemical filters; (j) an insulated heat sink reservoir where a phase-change heat exchanger and cooling ice are kept; (k) a standby temperature maintenance system for maintaining solid-phase ice inside the heat sink reservoir during standby (non-emergency) conditions, the temperature maintenance system consisting of one or more of four potential sources of cooling energy, namely (k1) a standard 120-240 AC electrical cooler for areas where there is no explosive atmosphere, (k2) an intrinsically-safe electrical heat pump (e.g., such as a Peltier thermoelectric cooler) for areas where explosive atmospheres may be present, (k3) a non-electrical heat extractor that uses the expansion of pre-stored compressed gas for areas where explosive atmospheres may be present, and (k4) another non-electrical heat extractor requiring infrequent manual visits to replenish small amounts of dry ice for installations where explosive atmospheres may be present; (l) a heat exchanger consisting of a metal-walled air duct embedded in the heat sink reservoir; (m) an air valve that can direct high flow rate air to the heat exchanger, thus largely bypassing the toxic gas filters as necessary to provide boost cooling/dehumidifying when that tradeoff is deemed appropriate; and (n) a control system consisting of both manual instructions for human operator control of the life support processes (as a foundational minimum) as well as optional computer automated control systems, which provide, among other things, computer monitoring of atmospheric conditions with software aided control and/or reporting of the life support processes/conditions according to real-time measurements.

Among the toxic gasses removed by the inventive system, carbon dioxide and carbon monoxide are generally the most problematic in refuge chambers during long occupancy. Thus, the present invention provides a CO and $CO_2$ scrubber capable of purifying breath exhaust of up to 30 refuge chamber occupants. The system can operate safely for 96+ hours on an internal battery without any ignition hazard. This is true even in places having explosive atmospheres such as methane and hydrogen. The system avoids the use of giant lead acid battery banks with distributed wiring.

The system also cools and dehumidifies refuge chamber air, thus offsetting human body heat and chemical reaction heat from the toxic gas scrubbing processes. This ensures atmospheric temperature/humidity conditions conducive to human survival for 96+ hours without heat stroke risk even in conditions of high ambient temperature/humidity, such as those found in deep underground mines.

The unit can be implemented in an all-inclusive unit, or provided in several operatively connected system components, such as by having the fan ventilation driver separated from the toxic gas filters and/or the cooler/dehumidifier using ductwork and valves for better ventilation and/or performance.

The system has an intrinsically safe standby battery charging feature, plus explosion-proof/flame-proof enclosures for all non-intrinsically-safe battery powered electrical parts of the system. All non-intrinsically safe portions of the system are rendered safe for use in hazardous highly explosive atmospheres, including atmospheres containing highly flammable methane and hydrogen.

Heat generation and dissipation of the motor is engineered to be at an absolute minimum to avoid adding heat to the occupied environment and to guarantee motor thermal reliability in enclosed spaces under harsh conditions. The motor combines exceptionally low motor dissipation plus exceptionally small motor size for excellent thermal conductivity (i.e., the ability to get heat out of the motor) plus innovative conductive heat sink design. It is believed to be the world's most efficient motor with the smallest form factor for lowest heat generation and highest heat dissipation (thermal conductivity).

The low-power design for the inventive system ensures that only a very amount of lead-acid batteries are used, thereby eliminating the need to ventilate hydrogen from the refuge chamber. It is entirely fail-safe and absolutely guaranteed not to require hydrogen gas ventilation. This is because there is too little water in the power system and therefore too few hydrogen atoms to ever reach the "lower explosive limit" of hydrogen and air in the chamber volume. Thus, no matter what kind of faults may occur in the charging system or due to battery failure or in the thermal runaway, the enclosure using the present invention will remain hydrogen explosion safe and hydrogen flame safe.

The toxic gas removal and AC system of the present invention uses a flame-proof driveshaft bearing assembly that allows a non-intrinsically-safe motor to reside inside the battery compartment. This is an inexpensive solution to the problem. Ignition hazards inside the enclosure are mitigated by the hydrogen explosion-proof/flame-proof enclosure.

The fan driver also uses a cost-effective "packing gland" as a key component in creating a flame-proof rotating driveshaft bearing assembly. This packing gland is normally used as a cable portal through the explosion proof enclosure.

The system includes an automated start feature that does not require occupant intervention to ensure fail-safe startup for victims who may barely reach the chamber before succumbing to exhaustion or unconsciousness.

The system also includes overload protection circuits that prevent driveshaft motor seizing, over-current, and other faults.

The exceptionally low noise fan design (less than 0.3 sones) helps support psychological well being of occupants who must listen to the fan unit while occupying the chamber.

The system also provides completely wireless remote monitoring for walk-by inspection/maintenance personnel via a handheld wireless monitoring unit.

The system may include a transmitter for wireless transmission of instructions to the system from the separate MineTracer gas and atmospheric monitoring/control system so as to control the rate of toxic gas removal and cooling/dehumidfying with automated computer assistance.

Structurally, the system is extremely rugged, explosion-proof, and intrinsically safe. The apparatus will withstand the secondary effects of a 15 psi explosion outside of the refuge chamber, as required by the Mine Safety and Health Administration (MSHA) test protocol for approved refuge chambers.

From the foregoing, it will be clear that it is an object of the present invention to provide a novel air-scrubbing system for use in underground mine survival chambers.

It is further an object of the present invention to provide a novel air-scrubbing system that is rugged enough to survive the hostile environment of an underground mine.

It is also an object of the present invention to provide a novel air-scrubbing system that can withstand the forces applied to it when an explosion occurs outside the survival chamber in which it resides.

It is further an object of the present invention to provide a novel air-scrubbing system that is intrinsically safe in an underground mine environment.

It is even further an object of the present invention to provide a novel air-scrubbing system that generates minimum sound while in operation, in order to aid in the psychological health of trapped miners who must listen to the system while occupying the chamber (in some cases, for long periods of time.)

It is also an object of the present invention to provide a novel air-scrubbing system that detects the loss of AC power to the system, and automatically starts operating when this condition is detected. This ensures operation, even when miners barely reach the chamber before succumbing to exhaustion or unconsciousness (the miners are not required to manually start or operate the air-scrubbing system.)

It is an additional object of the present invention to provide a novel air-scrubbing system that can be remotely monitored from a nearby location inside the mine, if a MineTracer FASC is installed outside the chamber.

It is finally an object of the present invention to provide a novel air-scrubbing system that can be remotely monitored from outside the mine (on the surface) via the MineTracer network), if a MineTracer network is installed in the mine.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIGS. 7B through 7D are, respectively, a cross-sectional side view in elevation, perspective view, and exploded perspective view, showing an alternative fan driveshaft bearing assembly;

DETAILED DESCRIPTION OF THE INVENTION

The following description includes details of the present invention—a toxic gas scrubber and air conditioning system as used in refuge chambers for underground coal mines. Reference should be made to the above-summarized views.

Figure 1:
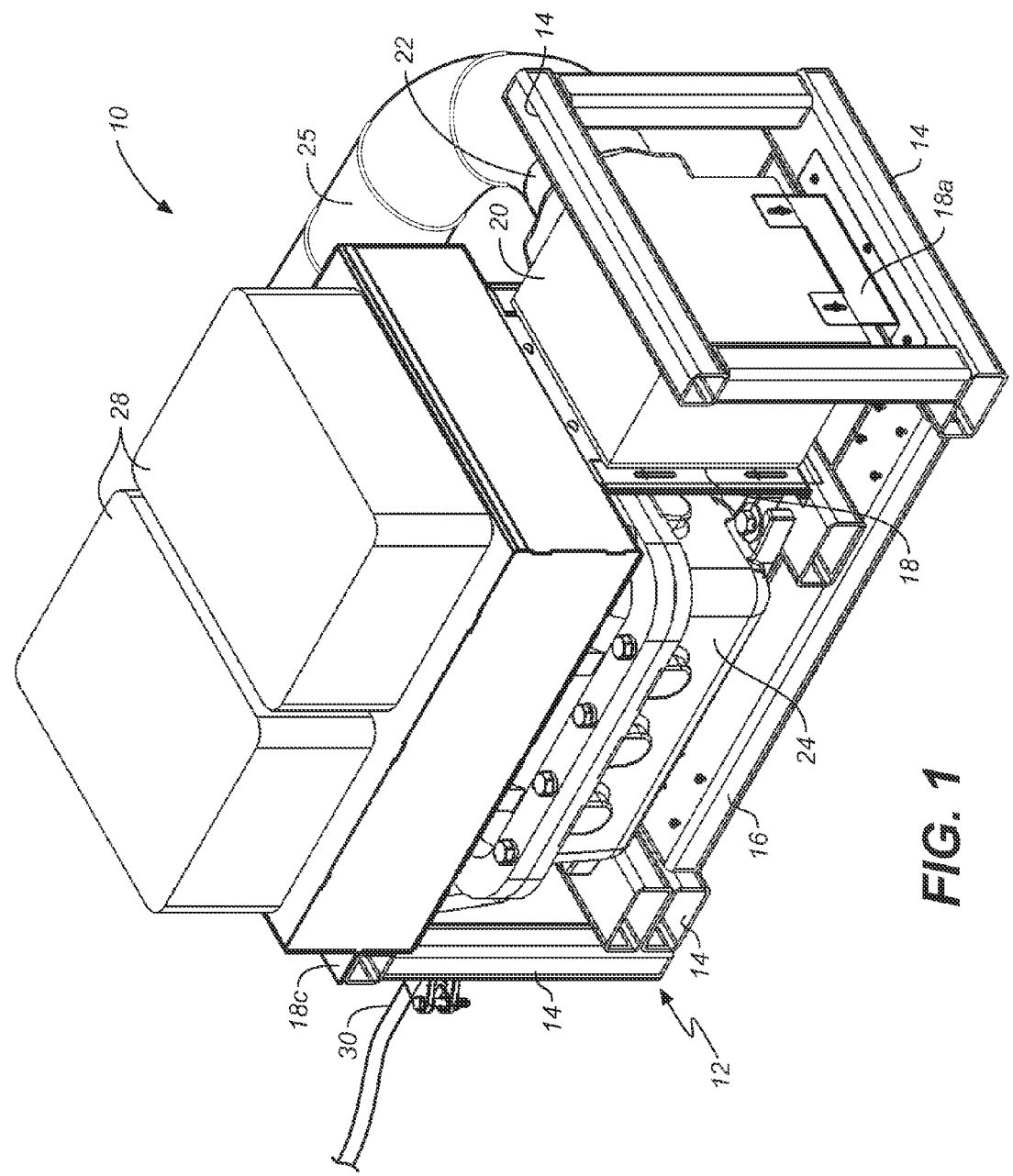
FIG. 1 is an upper front left perspective view showing the fan driver and toxic gas scrubber portions of the inventive toxic gas scrubber and air conditioning system for use in refuge chambers for underground coal mines.
Figure 2:
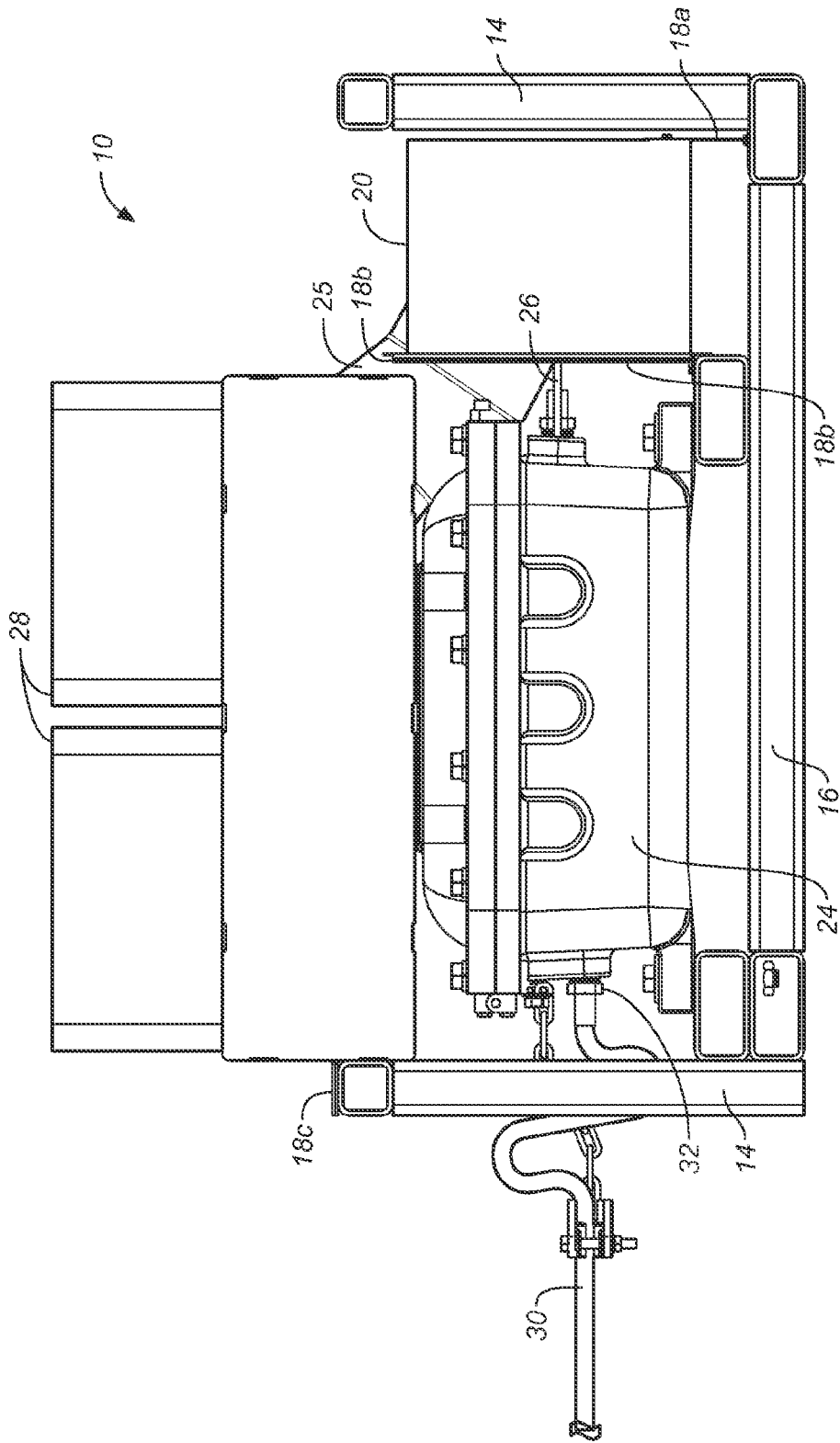
FIG. 2 is a left side view in elevation thereof.
Figure 3:
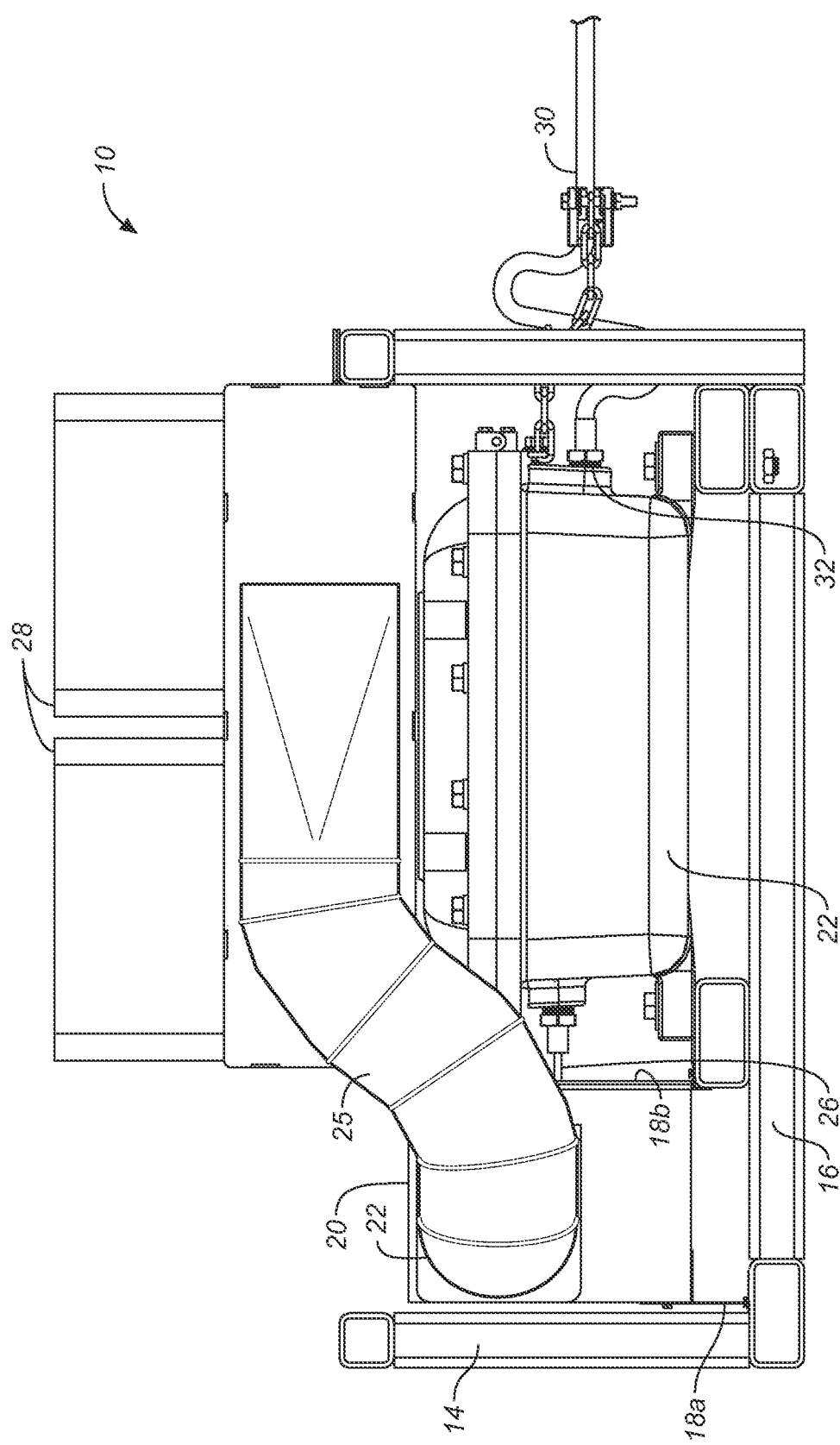
FIG. 3 is a ride side view in elevation thereof.

Referring first to FIGS. 1-3, there is shown a toxic gas scrubber portion 10 of the inventive system. The gas scrubber portion includes a chassis 12 comprising a framework 14 of extruded or hot rolled square and rectangular metal tubing connected to a base 16. Various mounting brackets 18a, 18b, 18c, screwed or bolted to the framework provide mounting elements for a fan 20 having an air output 22, a fan driver assembly 24 for powering the fan (preferably a squirrel cage, blower, or centrifugal fan) through a driveshaft 26, and chemical filters 28 in fluid communication with the fan through ducting 25. Power is provided to the fan driver through a power cable 30, which enters the fan driver assembly enclosure through a power cable gland 32. These are the fundamental functional units of the gas scrubber. However, as will be appreciated by the following, the gas scrubber itself includes a number of novel features that make it perfectly suited for the incorporation and use in a refuge chamber installed in an underground mine.

Figure 4:
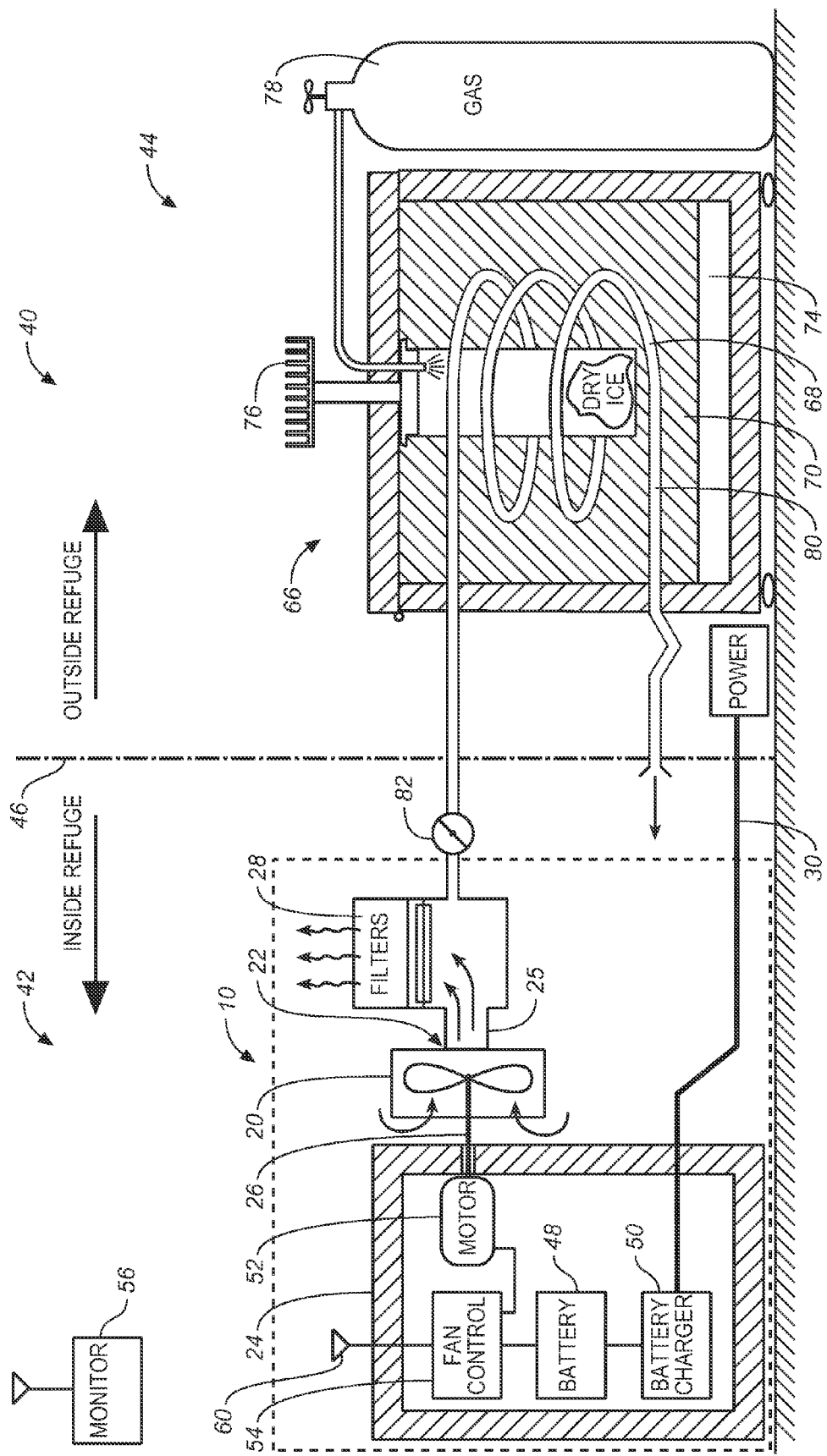
FIG. 4 is a highly schematic cross-sectional side view in elevation of the entire inventive system and the location of the various system elements in relation to the refuge chamber wall.
Figure 5:
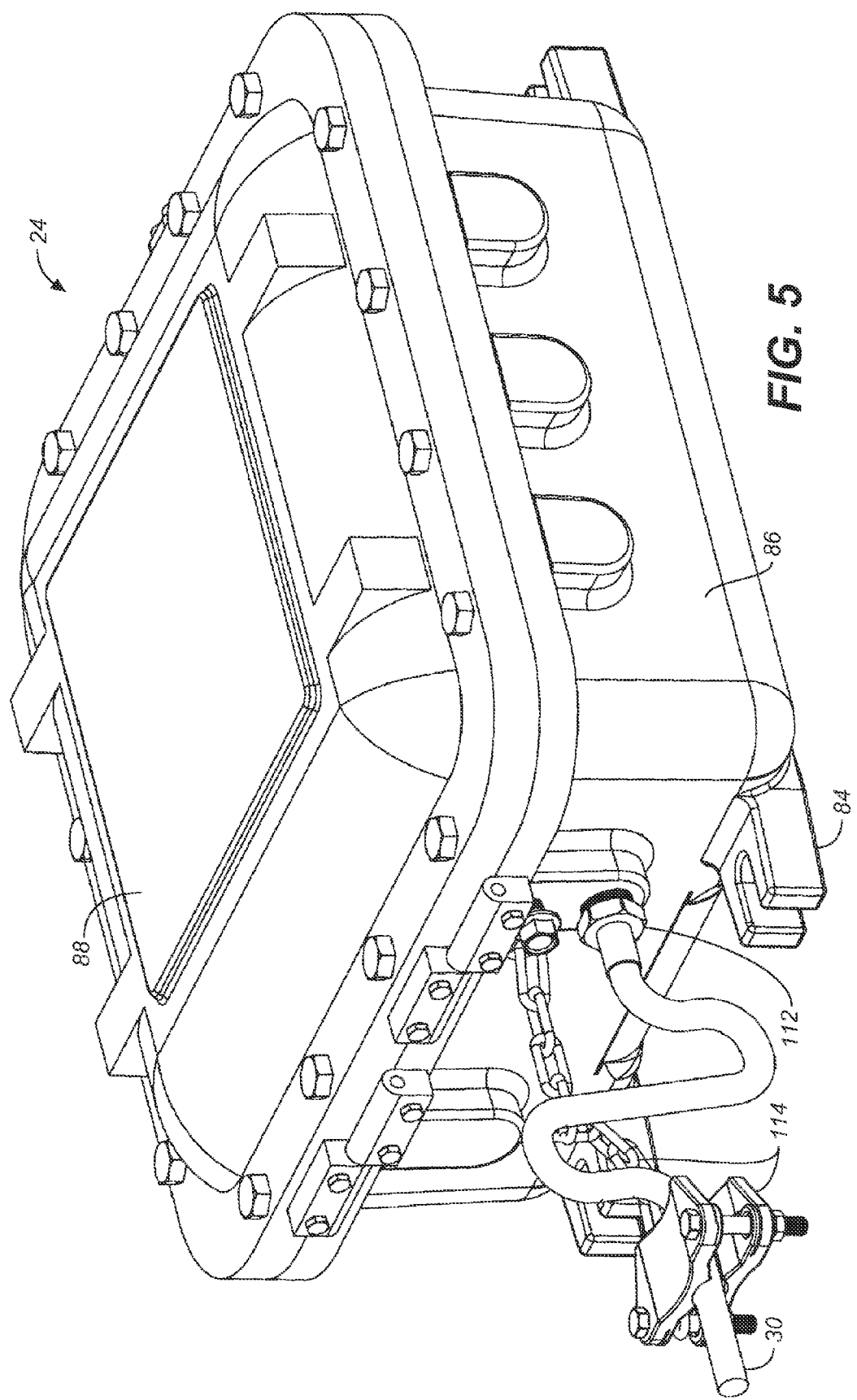
FIG. 5 is an upper left rear perspective view of the explosion/fire/flame proof enclosure and showing the configurations for the power cable and fan driveshaft.
Figure 6:
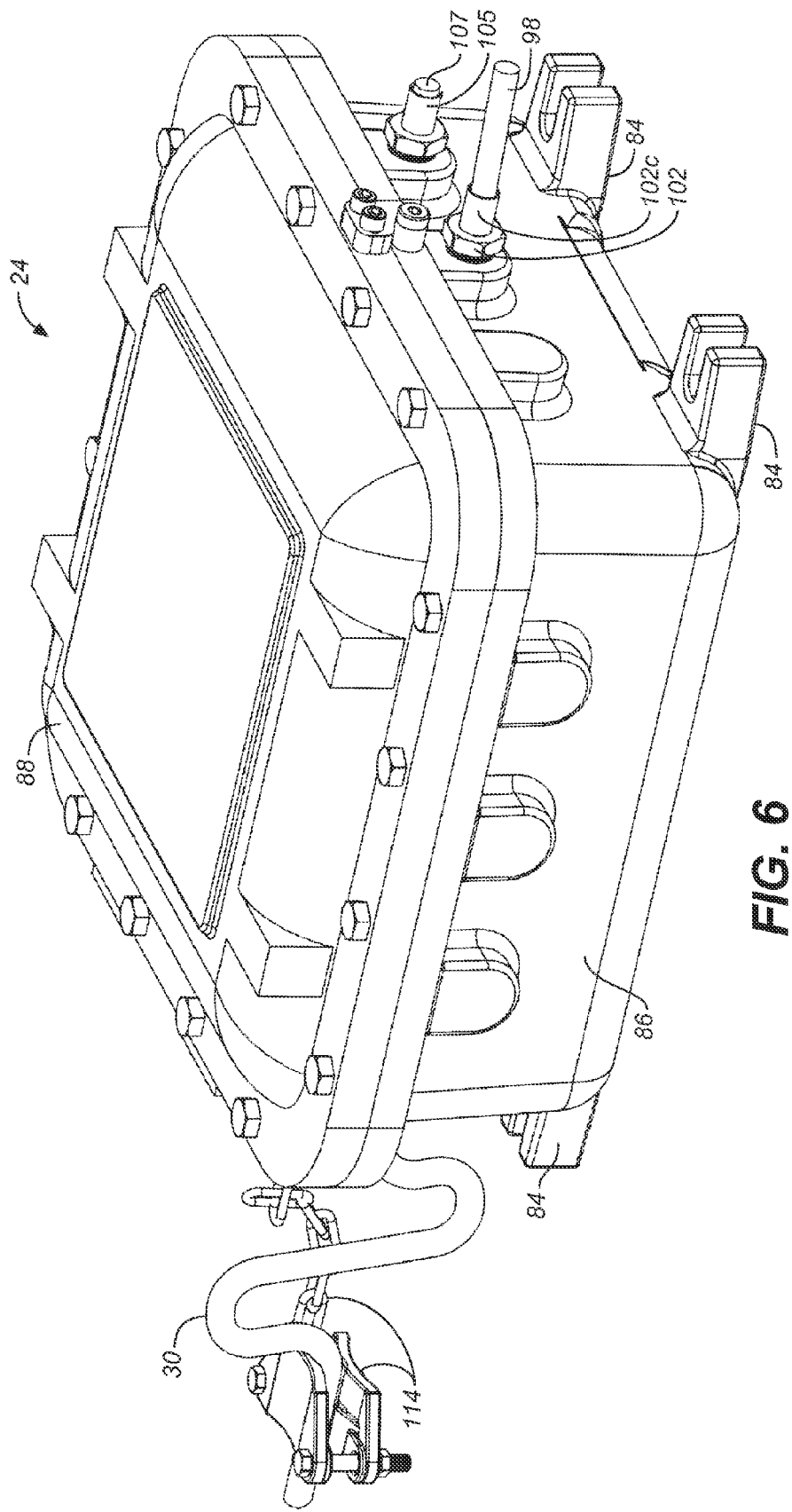
FIG. 6 is an upper front left perspective view thereof.
Figure 7:
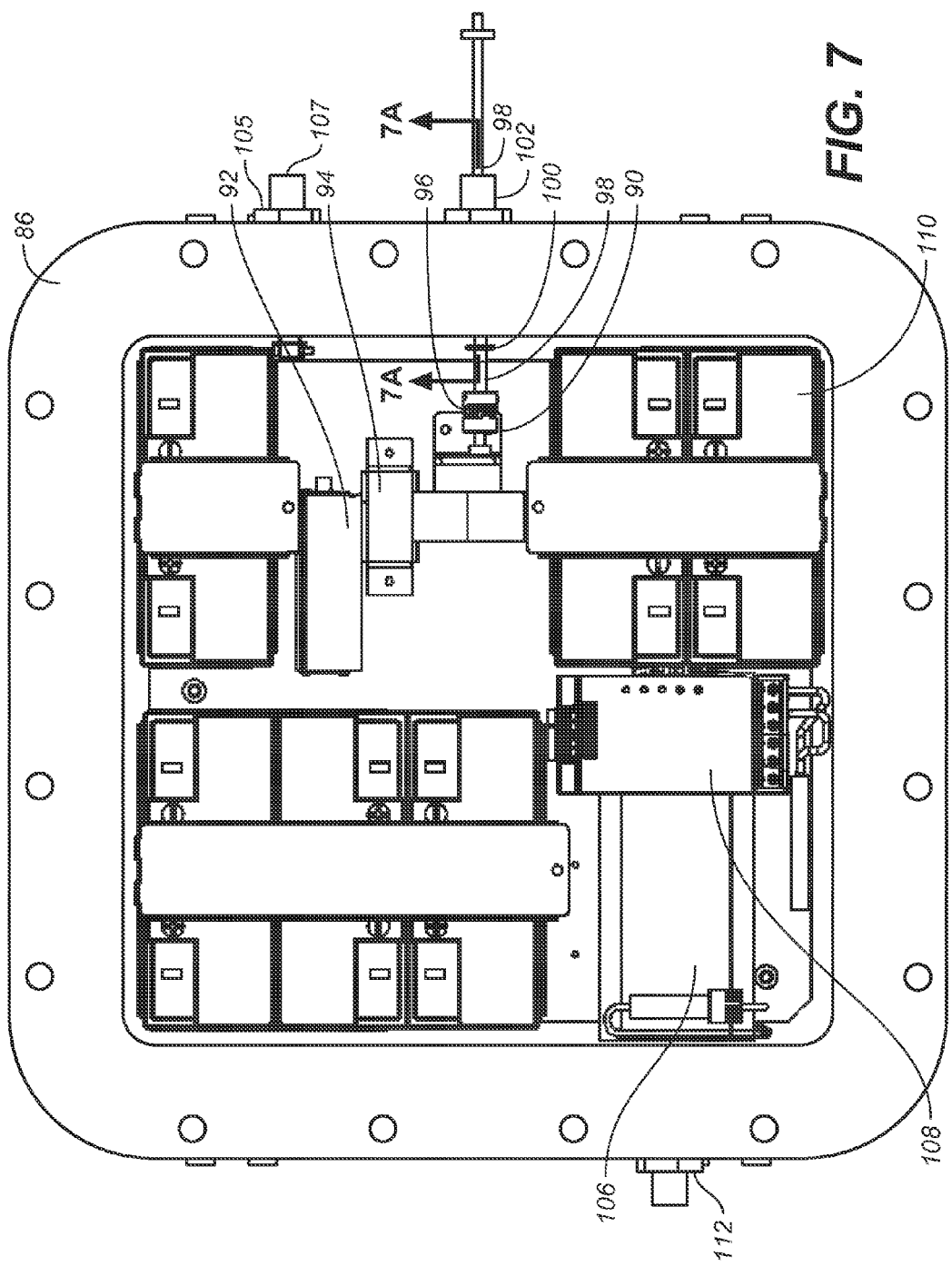
FIG. 7 is a schematic top plan view of the fan driveshaft assembly of the present invention shown with the enclosure cover removed.
Figure 7A:
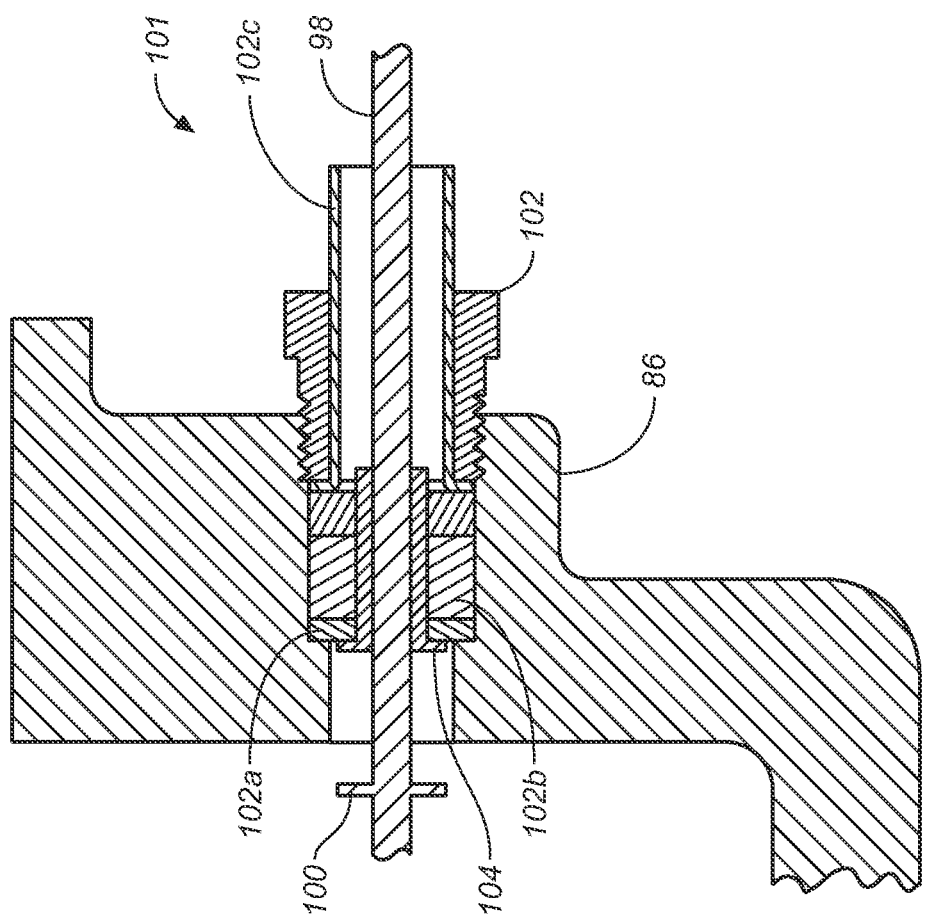
FIG. 7A is detailed cross-sectional plan view of the solid rod assembly used to plug an enclosure hole.

For instance, and referring now to FIG. 4, it will be seen that in its most essential aspect, the overall inventive system 40 looked at from the highest level of abstraction includes system elements inside the refuge chamber 42, and elements disposed outside the refuge chamber 44, the division defined by the refuge chamber wall 46. Looked at in more detail, the system includes: (a) a battery powered ventilation fan 20 to recirculate air; (b) a rechargeable battery 48; (c) a battery charging system 50; (d) a fan motor 52 contained inside an explosion-proof and flame-proof enclosure 24; (e) a fan motor driver/controller circuit 54 having a wireless interface to external wireless monitoring and/or control devices 56; (f) an air blower assembly that is mechanically driven by the fan motor via an explosion-proof/flame-proof driveshaft bearing assembly 58; (g) an antenna 60; (h) a set of chemical filters 28 tailored to remove particular toxic gasses, including at least carbon monoxide and carbon dioxide; (i) an air duct system 25 that delivers the proper air pressure and flow rate conditions to efficiently drive contaminated air through the necessary chemical filters; (j) an insulated heat sink reservoir 66 where the phase-change heat exchanger 68 and cooling ice 70 are kept (the ice in this instance preferably being ordinary ice made from water); (k) a standby temperature maintenance system 72 for maintaining solid-phase ice inside the heat sink reservoir during standby conditions (non-emergency), the temperature maintenance system consisting of one or more of four potential sources of cooling energy, namely (k1) a standard 120-240 AC electrical cooler 74 for areas where there is no explosive atmosphere, (k2) an intrinsically-safe electrical heat pump 76 (e.g., such as a Peltier thermoelectric cooler) for areas where explosive atmospheres may be present, (k3) a non-electrical heat extraction apparatus 78 that uses the expansion of pre-stored compressed gas for areas where explosive atmospheres may be present, and (k4) another non-electrical heat extraction method involving infrequent manual maintenance of small amounts of dry ice 71 for installations where explosive atmospheres may be present (and which keeps ice 70 from melting); (l) a heat exchanger 80 consisting of a metal-walled air duct embedded in the heat sink reservoir; (m) an air valve 82 that can direct high flow rate air to the heat exchanger, thus largely bypassing the toxic gas filters as necessary to provide boost cooling/dehumidifying when that tradeoff is deemed appropriate; and (n) a control system 56 consisting of both manual instructions for human operator control of the life support processes (as a foundational minimum) as well as optional computer automated control systems (e.g. computer monitoring of atmospheric conditions with software aided control and/or reporting of the life support processes/conditions according to real-time measurements).

Referring next to FIGS. 5-7A, there is shown the fan driver assembly employed in the present invention. This assembly is a completely self-contained and battery powered motor drive unit used to spin an external mechanical squirrel cage fan blade assembly that blows re-circulating air through the carbon dioxide scrubber/ventilator system. The entire assembly is housed inside an MSHA approved explosion-proof and flame-proof enclosure. The fan driver assembly automatically sources approximately 10 Watts of rotating mechanical energy via the integral driveshaft that exits the explosion proof enclosure. The unit connects to the mine AC electrical system, which is normally de-energized during mine accidents and ventilation failures. The unit maintains internal batteries at a state of full charge, and when the unit detects a loss of mine AC electrical power (either because the power has been shutdown mine-wide, or because the power has been disconnected at the input to the unit), it automatically energizes the motor drive and runs for 96+ hours on internal battery power. An optional wireless device inside the enclosure can be used to remotely (wirelessly) monitor operational parameters of interest. The communications between the fan driver assembly and any external wireless devices is 100% wireless, and thus the interplay has no bearing on permissibility or intrinsic safety of the system. If the optional wireless device is employed, the radio transmits at very low power (e.g., less than 1 milliwatt ERP) such that it is safe for use in close proximity (zero clearance) to blasting caps and blasting circuits.

Enclosure:

The fan driver assembly first includes an enclosure 24 certified as explosion-proof and flame-proof. In a preferred embodiment, the enclosure may be a model #S9318-R Adalet Explosion Proof Enclosure manufactured by Adalet of Cleveland, Ohio, though other comparable enclosures, if certified, may be appropriate. Internal methane/air volume of the enclosure is less than or equal to the already approved instances of the product, and the total power dissipation (less than 20 Watts) is also less than or equal to the already approved instances of the product. Temperature rise of the enclosure does not exceed 3 degrees C. above ambient. Conductor runs into and out-of the box are identical to those in the existing approvals (AC power cord only). The enclosure includes mounting brackets 84 for bolting the base 86 of the enclosure to the chassis base 16. The top 88 of the enclosure is bolted to the base. When the top is removed, the motor drive unit of the fan driver assembly can be examined.

Motor Drive:

The fan driver assembly 24 uses a miniature 10 Watt DC motor 90 manufactured by Maxon Motor of Switzerland. The motor is energized by an internal voltage regulator board 92. The motor and gear reduction assembly are about the size of a conventional D-cell alkaline battery. The motor is mounted within a massive conductive aluminum heat sink 94 to efficiently draw heat to the external body of the explosion-proof enclosure. The thermal efficiency of this assembly has been measured at 2 degrees C. per Watt. An insulated U-Joint shaft coupler 96 connects the motor shaft to the stainless steel driveshaft 98. A cotter pin or stainless steel washer 100 welded to the driveshaft ensures that the rod cannot fall out of the enclosure if it were to ever come loose from the shaft coupler. The flame-proof rotating bearing assembly 101 (cylindrical joint portal) is a packing gland assembly disposed through the wall of the enclosure base 86 (see FIG. 7A) that includes a threaded coupler (or jam nut) 102 threadably inserted into the enclosure base, a flanged bronze bushing 104 (preferably a sleeve bearing), disposed inside a stuffing box 102*a* containing packing 102*b*, and a flanged gland follower 102*c* urged against and retaining stuffing box 102*a* in the enclosure base 86 by jam nut 102. The steel rod driveshaft 98 is axially disposed through all of the elements of the flame-proof rotating bearing assembly.

In an alternative embodiment, as shown in FIGS. 7B-7D, flame-proof rotating bearing assembly 120 includes a gland housing 122 having a proximal end 124 and a distal end 126, each having a rolling element bearing 128, 130, respectively, a packing ring 132, 134 disposed between the bearing and the gland housing, and retaining rings 136, 138 retaining both the bearing and packing rings in the gland housing. Locking pin 140 prevents unwanted rotation of the assembly.

An optional coaxial cable antenna 103 (see FIG. 8) can be disposed in another penetration in the enclosure, which is otherwise sealed with a packing gland 105 and a stainless steel tube plug 107.

Power Supply:

Still referring to FIGS. 5-7A, the DC power supply 106, UPS controller 108, and backup battery system 110 use a continuous preservation charge regimen (float charge) to maintain the batteries near full capacity while AC is provided by the mine AC electrical system. Power supply from the mine AC electrical system is delivered to the power supply by a power cable 30 which penetrates the enclosure base 86 through a cable gland 112. The power cable is prevented from being pulled from the enclosure through the use of a clamp and chain assembly 114.

The charge circuits of the uninterrupted power supply controller (preferably manufactured by Phoenix Contact of Middletown, Pa.) are temperature compensated and designed expressly to ensure that the batteries are slowly charged and never overcharged, and that the battery charge profile asymptotes to a 13.6 Volt maximum float voltage (<10 mA) and never approaches the gassing threshold of 14.4 Volts. Under no circumstance is the charging current ever allowed to exceed 1.0 Amps; provided, however, such an excursion may occur briefly for a completely dead battery when using the selected 3.4 A/hr setting on the UPS controller, which is far below the C-Rate for the batteries (5% of C rate). Sealed lead acid batteries are used, and with charge rates kept so far below the gassing threshold there are only insignificant amounts of hydrogen and oxygen produced in the cells. These gas molecules quickly recombine back into water within the cells. By measurement, hydrogen does not accumulate at explosive levels within the enclosure, but in any case there is no danger from any hydrogen present, as it has been shown that the particular cast aluminum explosion-proof enclosure used to house these batteries is certified to safely contain a hydrogen deflagration (explosion-proof and flame-proof for hydrogen).

Figure 8:
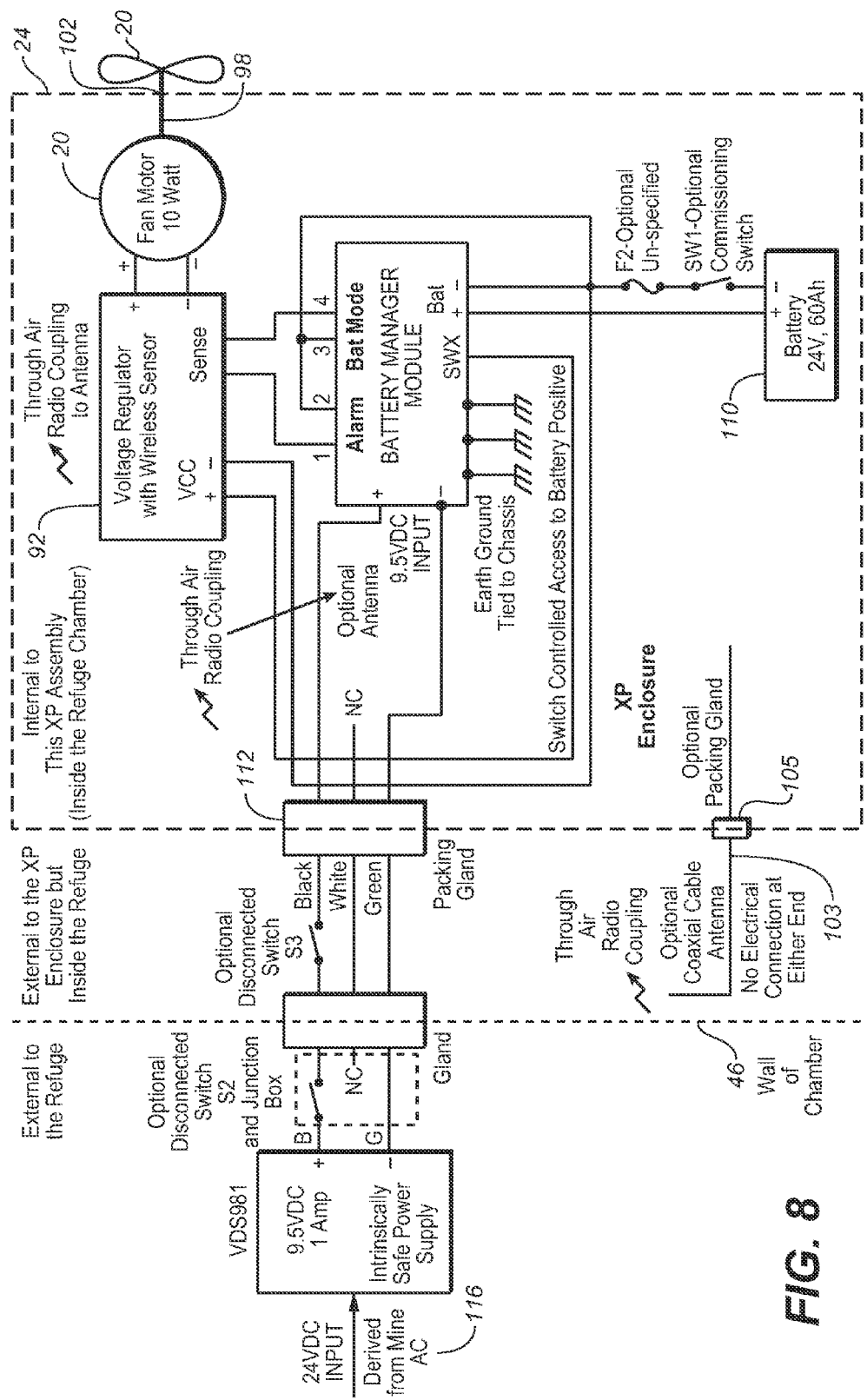
FIG. 8 is a wiring schematic diagram of the fan motor driver/controller.

Backup Battery System:

Referring now to FIG. 8, when mine AC power is de-energized, or when AC 116 into the fan driver assembly unit is disconnected, the system automatically energizes the motor via internal battery power. The 24 volt DC battery source will power the fan driver assembly for 96 hours after AC is de-energized. The AC line cord incorporates an MSHA approved flame resistant jacket.

Voltage Regulator Board (Motor Control Regulator):

The voltage regulator 92 allows motor drive voltage and power to be set in the factory. The voltage, which is proportional to motor speed, is adjustable and can be set between 2 to 28 VDC, and is nominally set to 18 VDC. The voltage regulator also limits maximum current/power to 750 mA or 15 Watts, even under short circuit conditions. Over-temperature shutdown is incorporated as well, but under no circumstances is it physically possible for the 15 Watts of fault power dissipation to raise the temperature of the explosion-proof enclosure more than 10 degrees C. above ambient (calculated and measured). Normal rotating shaft speed of the drive system is 684 revolutions per minute at a total power output of 10 Watts. The external mechanical squirrel cage fan blade assembly (not part of this assembly) is completely mechanical and has no bearing on intrinsic safety. The fan blade assembly generates ~70 CFM of airflow at 0.25 inch water gauge static pressure when driven by this motor.

Figure 9A:
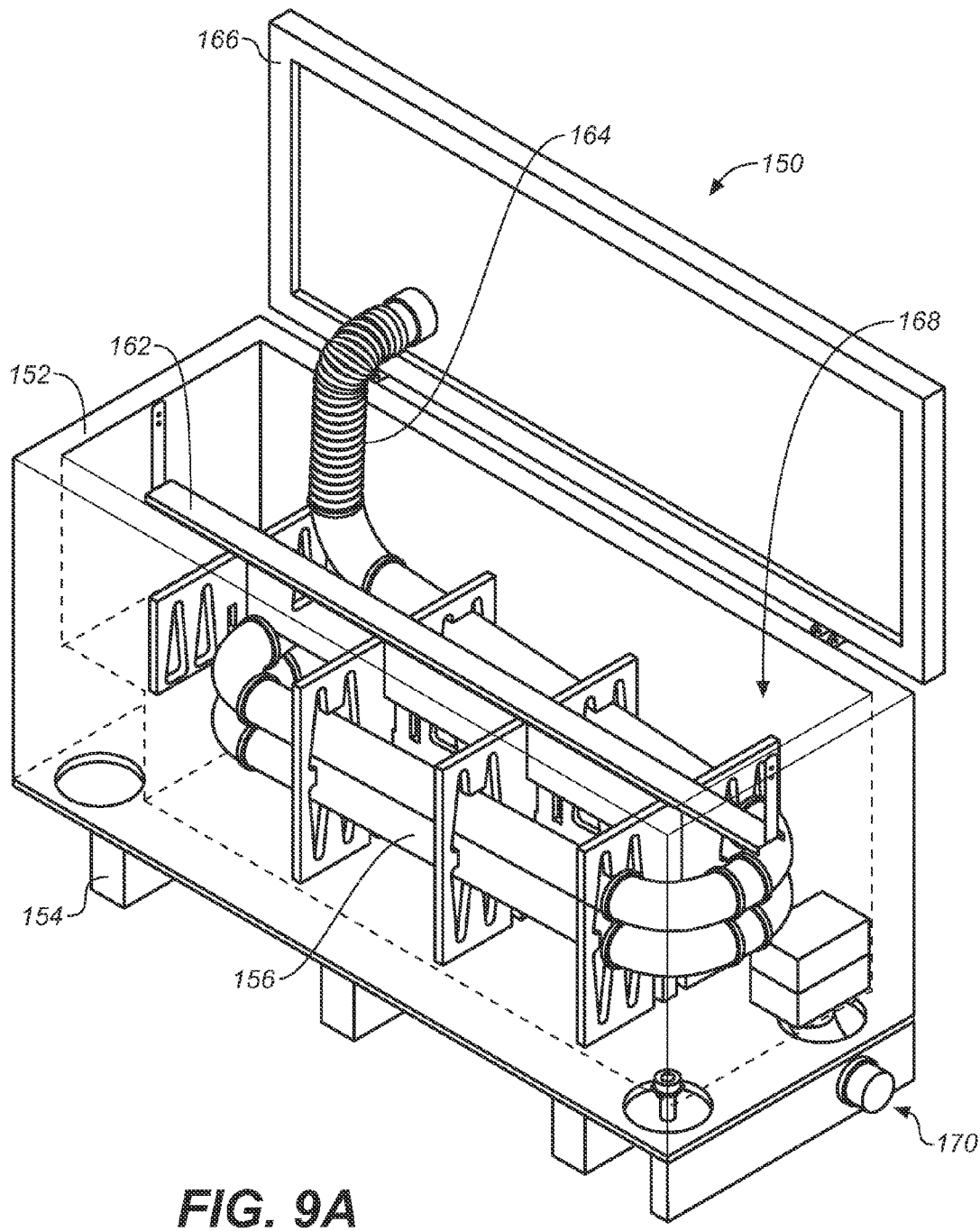
FIG. 9A is an upper right front perspective view of a preferred embodiment of a heat exchange unit for use in the inventive system.
Figure 9B:
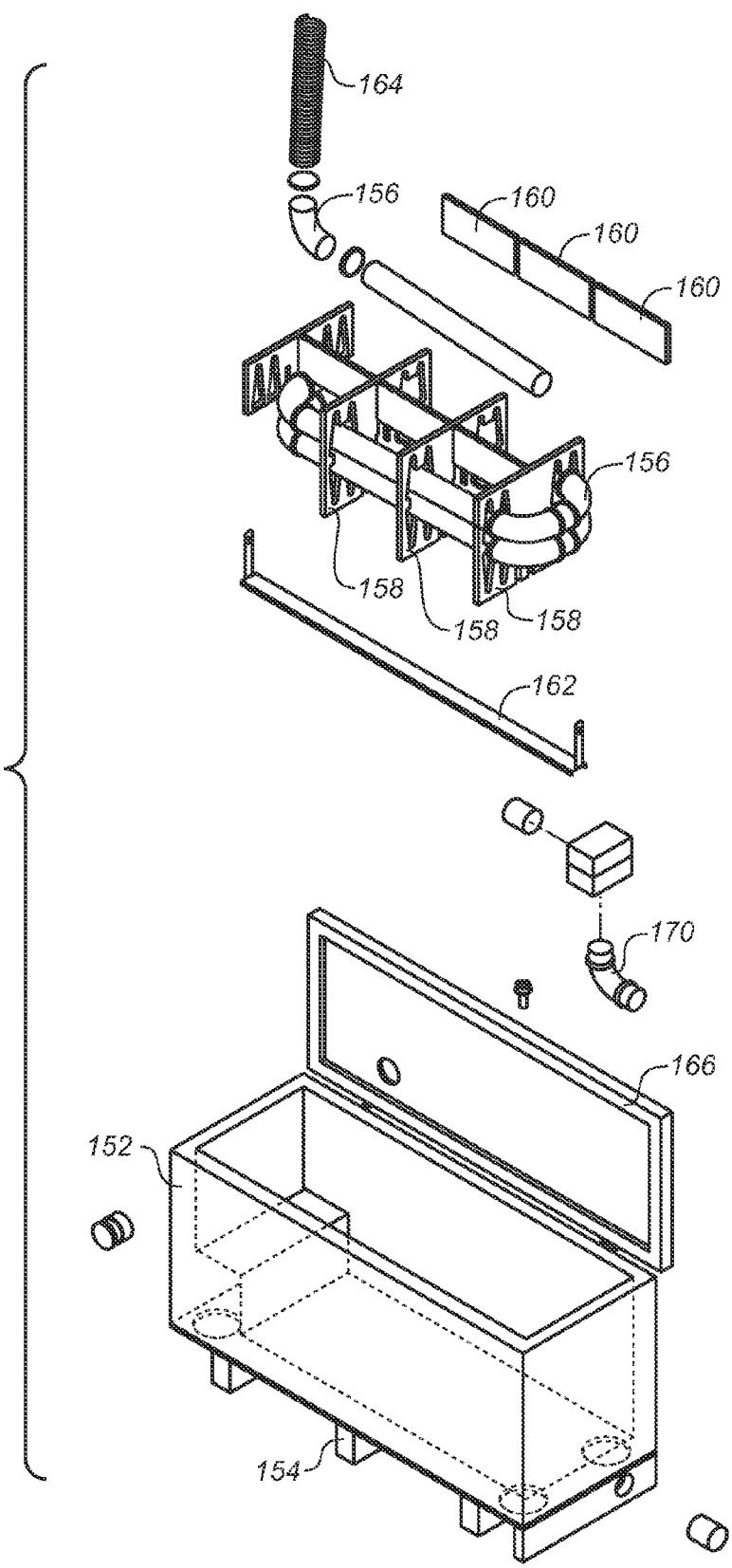
FIG. 9B is an exploded front right perspective view thereof showing details of the operational elements of the heat exchange unit.

FIGS. 9A and 9B show a preferred embodiment of the heat exchange unit used in the inventive air-scrubbing and air conditioning system. The unit 150 includes a 25 cubic foot box 152 mounted on a pallet, or unit base 154. A length of coiled aluminum pipe 156 is disposed in a spiral-like configuration on and through a plurality of vertically disposed brackets 158 spaced apart by freezer foam blocks 160 and comprising a pipe scaffold, which is secured within the box 152 with a hold down, or brace 162. A flexible hose air inlet 164 disposed through the box lid 166 feeds air from the air blower assembly earlier discussed through the coiled pipe. The volume 168 surrounding the pipes is filled with ice or other coolant, thereby providing a heat exchange medium to remove and absorb heat from air circulating in the pipe. The air outlet 170 in the lower portion of the box sends cooled air back to the refuge chamber, also as described above.

Note on Hydrogen Production as it Pertains to Refuge Chamber Safety:

Unlike known refuge chamber lead acid power systems in production or development, the efficient electronic systems of the present invention are engineered to operate refuge chambers for at least 96 hours on much smaller amounts of lead-acid battery power. Lead-acid battery weight/volume is at least 100 times greater with other designs. The lead-acid batteries used in the inventive fan driver assembly are extremely small by comparison, and limit the total amount of hydrogen that can be produced to levels well below safety thresholds. This is guaranteed as a fail-safe because the electrolysis process that results in hydrogen production is self-limiting by virtue of the limited amount of water ($H_2O$) available inside the battery for conversion into hydrogen. The preferred batteries, Panasonic VRLA batteries, contain 770 g of water, of which 86 grams of $H_2$ molecules are available to be converted to gaseous hydrogen (18 grams of $H_2O$ is comprised of 2 grams hydrogen plus 16 grams oxygen). But only one quarter of this water can be electrolyzed into hydrogen under worst case over-current/over-temp conditions because of water vapor permeation, corrosion of the positive grid, and oxygen recombination into water (see references). Thus 25% water loss to hydrogen gas emission would result in a total volume of liberated gaseous hydrogen equal to 239 liters. Thus, 239 liters of hydrogen can be produced by electrolysis if there is total destruction of the battery such that all convertible hydrogen is liberated from the electrolyte into gas. The 239 liters of hydrogen mixes with the refuge chamber air volume of 30,000 liters, resulting in a total volume concentration of ~0.8%. This very conservative analysis is based on near perfect conversion of all of the water-borne hydrogen in the battery, under a severe abuse scenario that should be impossible under even multiple fault conditions in this refuge chamber application. The 0.8% calculated worst-case volume ratio is well under both the 2% design goal of IEEE 484 for enclosed spaces, as well as the 4% LEL for hydrogen. Importantly, it is impossible to reach the LEL under any conditions because there is simply not enough water (the source of hydrogen) in the battery system, even if every water molecule could be perfectly converted to free hydrogen and oxygen gas.

A further corollary analysis demonstrates that the rate of gas production is very slow, even under worst case abusive conditions, and so the natural diffusion and hydrogen/air mixing will be slow, uniform and complete. Severe overcharge at 65 degrees C. (which will never occur, even under multiple fault conditions) is calculated to liberate hydrogen at a maximum rate of 0.4 liter per hour for this system (0.288 liter per hour was actually measured in the reference cited below), which, if sustained, would require 543 hours (theoretical) or 830 hours (demonstrated; by abusive experiment) to discharge the 239 liters of $H_2$. Free hydrogen does not stratify in air, and the natural diffusion processes will thoroughly mix the hydrogen and air over this very long time period. And finally, an additional safety feature is built into the charge controller to perform an auto-test of the battery health every 180 hours. This test will automatically report conditions of the kind described herein and which would result in severe degradation (severe outgassing and water loss) of the battery.

In summary, unlike large lead-acid batteries, small lead-acid batteries have a built-in self-limiting safety feature that limits how much total hydrogen can be produced under abusive and/or fault conditions. This feature arises from the limited amount of water a small lead-acid battery contains, and the fact that internal water is the source of all hydrogen molecules that can be liberated from a battery during electrolysis.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed as invention is:

1. An intrinsically safe, self-contained toxic gas removal and air conditioning system for use in an underground mine survival chamber to continuously remove contaminant $CO_2$ or CO or both from the air sealed in the survival chamber as introduced by the respiratory exhalations of chamber occupants, said system comprising:
   an explosion proof and flame proof external shell rated to withstand a 15 psi external explosive force;
   an internal battery capable of at least 96 hours of continuous operation, said battery having insufficient water to provide the lowest explosive level of hydrogen under the worst conditions;
   a fan motor mounted inside said external shell and driven by a fan motor/driver control circuit, said fan motor operatively coupled to a driveshaft that extends to the outside of said external shell; and
   a power supply circuit in communication with said fan motor/driver control circuit, said power supply circuit including an AC power loss circuit to detect the loss of externally-provided AC power, and automatically starting operation of said fan motor when the loss of externally-provided AC power is detected.

2. The toxic gas removal and air conditioning system of claim 1, wherein said fan driver circuit is connected to a wireless communication transceiver, and in communication with a transceiver that is within radio range of said transceiver.

3. The toxic gas removal and air conditioning system of claim 1, wherein said system is in fluid communication with external ducting, such that said $CO_2$ filters can be remotely located where appropriate to improve circulation or ventilation.

4. The toxic gas removal and air conditioning system of claim 1, further including a monitoring circuit and transmitter for wireless communications to a remote monitoring system external to the underground mine survival chamber for monitoring from a nearby location inside the mine or on the surface outside the mine.

5. The toxic gas removal and air conditioning system of claim 4, wherein said remote monitoring system is a wireless mine tracking, monitoring, and rescue communications system.

6. The toxic gas removal and air conditioning system of claim 1, further including a fan operatively connected to said fan driveshaft, wherein said fan includes chemical filters for removing toxic gasses, including at least carbon monoxide and carbon dioxide, and wherein said fan routes fan exhaust upwardly in the underground mine survival chamber so as to employ natural convection to recirculate and ventilate the area enclosed within the survival chamber.

7. The toxic gas removal and air conditioning system of claim 6, wherein said fan includes a fan pickup located at floor level beneath said fan.

8. The toxic gas removal and air conditioning system of claim 1, wherein said fan motor is sized small enough in relation to the survival chamber enclosure such that heat generation and dissipation guarantee motor thermal reliability in the enclosed space, and wherein the number and size of the lead-acid batteries necessary to operate the toxic gas removal and air conditioning system is small enough that the need to ventilate hydrogen from the survival chamber is eliminated and such that there is insufficient water in the batteries to ever reach the lower explosive limit of hydrogen in the chamber enclosure.

9. The toxic gas removal and air conditioning system of claim 1, wherein said fan driveshaft is axially disposed through a packing gland in a flame-proof driveshaft bearing assembly.

10. The toxic gas removal and air conditioning system of claim 9, further including overload protection circuits to ensure against driveshaft seize and over-current.

11. The toxic gas removal and air conditioning system of claim 1, wherein said fan motor driver/controller circuit has a wireless interface to external wireless monitoring and/or control devices.

12. The toxic gas removal and air conditioning system of claim 1, further including an insulated heat sink reservoir and ducting in fluid communication with said fan and routed through said insulated heat sink reservoir and returning to the survival chamber, said heat sink reservoir containing a phase-change heat exchanger and refrigerant material.

13. The toxic gas removal and air conditioning system of claim 12, further including a standby temperature maintenance system for maintaining solid-phase ice inside said heat sink reservoir during standby conditions.

14. The toxic gas removal and air conditioning system of claim 13, wherein said temperature maintenance system includes a source of cooling energy selected from the group consisting of a standard 120-240 AC electrical cooler, an intrinsically-safe electrical heat pump, a non-electrical heat extractor.

15. The toxic gas removal and air conditioning system of claim 14, further including an air valve for selectively directing high flow rate air to said heat exchanger and bypassing said chemical filters as needed to provide boost cooling and dehumidifying.

16. The toxic gas removal and air conditioning system of claim 1, further including a control system including means for human operator control of life support processes and computer automated control systems providing computer monitoring of atmospheric conditions with software aided control and/or reporting of the life support processes/conditions according to real-time measurements.

17. A toxic gas removal and air conditioning system for a refuge chamber, comprising: an explosion-proof and flame proof enclosure in which are disposed a fan driver assembly, including a fan motor, a fan motor driver/controller circuit having a wireless interface to an external wireless monitoring or control device, a rechargeable battery, and a battery charging system; an air blower mechanically connected to said fan motor through a fan driveshaft disposed through an explosion-proof and flame-proof driveshaft bearing assembly; a monitor wirelessly connected to said fan motor driver/controller wireless interface and having an antenna; one or more chemical filters for removing toxic gasses, including at least carbon monoxide and carbon dioxide; an air duct system in fluid communication with said air blower for delivering air at a proper air pressure and flow rate to drive contaminated air through said chemical filters; an insulated heat sink reservoir including a heat exchanger; an air duct in fluid communication with said air blower, said air duct routed through said heat sink reservoir for selectively cooling and dehumidifying air circulating through said air duct, said air duct having an air outlet for discharging cooled air into the refuge chamber; a standby temperature maintenance system for maintaining solid-phase ice inside said heat sink reservoir during standby conditions; an air valve for selectively directing air to said heat exchanger; a control system having manual control means for human operator inputs and computer automated control systems for automatic monitoring of conditions inside the refuge chamber; wherein said fan driver assembly is electrically connected to an external source of AC power and maintains said rechargeable batteries at a state of full charge, and when said fan driver assembly motor/driver controller detects a loss of external AC electrical power, said motor/driver controller automatically energizes said fan motor drive assembly.

18. The toxic gas removal and air conditioning system of claim 17, wherein said fan driver assembly is a self-contained and battery powered motor drive unit and said air blower is a mechanical squirrel cage fan blade assembly.

19. The toxic gas removal and air conditioning system of claim 17, wherein said explosion-proof and flame-proof driveshaft bearing assembly includes a gland housing having a proximal end and a distal end, each of said proximal and distal end including a rolling element bearing and a packing ring disposed between said rolling element bearing and said gland housing, and a retaining ring retaining both said rolling element bearing and said packing rings in said respective end.

20. The toxic gas removal and air conditioning system of claim 17, further including a cable antenna disposed through a packing gland spanning a penetration in said explosion-proof and flame proof enclosure and electrically connected to said fan motor/driver controller circuit.

21. The toxic gas removal and air conditioning system of claim 17, wherein said standby temperature maintenance system is provided with an energy source configured according to the likelihood of having an explosive atmosphere present around the refuge chamber.

22. The toxic gas removal and air conditioning system of claim 17, wherein said heat exchanger is a phase-change heat exchanger.

23. The toxic gas removal and air conditioning system of claim 22, wherein said phase-change heat exchanger is located outside the refuge chamber.

* * * * *